C. J. TRUCANO.
VEHICLE SPRING.
APPLICATION FILED JULY 3, 1915.
1,178,692.
Patented Apr. 11, 1916.
Fig. 1.
Fig. 2.
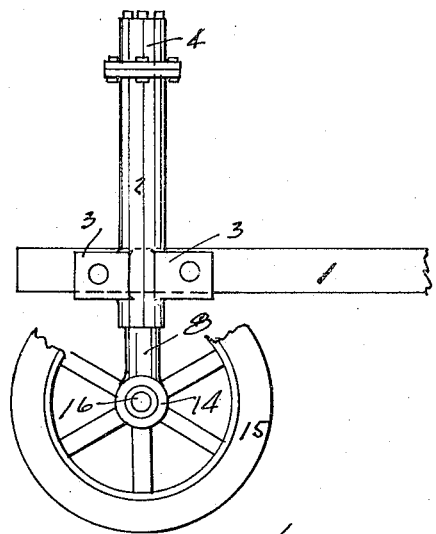
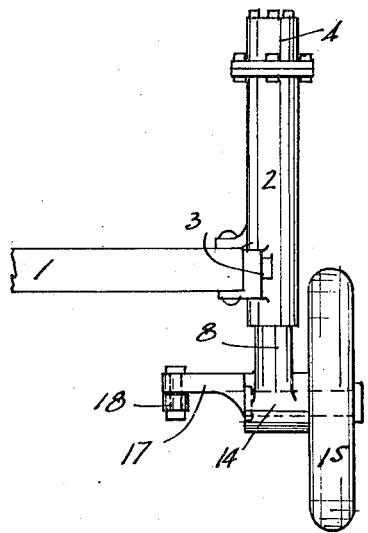
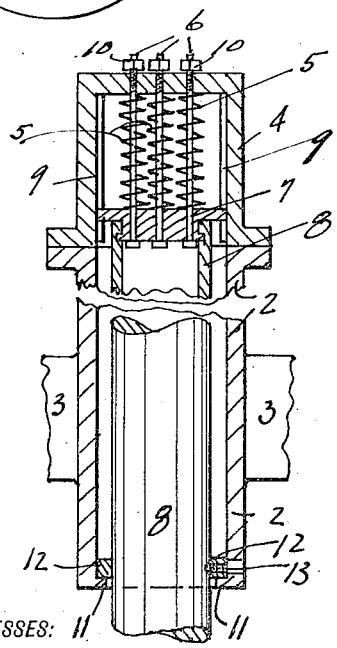
Fig. 3.
WITNESSES:
Frank H. Fowler.
INVENTOR
Charles J. Trucano
BY
*Fred P. Gorin*
ATTORNEY

UNITED STATES PATENT OFFICE.

CHARLES J. TRUCANO, OF CLE ELUM, WASHINGTON, ASSIGNOR OF FORTY-NINE ONE-HUNDREDTHS TO BATTISTA SALVINI, OF KITTITAS COUNTY, WASHINGTON.

VEHICLE-SPRING.

1,178,692.

Specification of Letters Patent.

Patented Apr. 11, 1916.

Application filed July 3, 1915. Serial No. 37,797.

*To all whom it may concern:*

Be it known that I, CHARLES J. TRUCANO, a citizen of the United States, and resident of Cle Elum, in the county of Kittitas and State of Washington, have invented certain new and useful Improvements in Vehicle-Springs, of which the following is a full, true, and exact specification.

My invention relates to vehicle springs and more particularly to springs for auto trucks and the like and has for its principal object, to provide an arrangement of springs which will permit of adjustments as to the range of deflection due to variations in either load or road conditions.

A further object is to provide means for adjusting the spring and container so as to vary the distance between the tread of the wheel and the frame of the truck in such a way as to allow the load on the truck to maintain a more nearly horizontal position while traveling on a grade.

Other objects will appear as my invention is more fully explained in the following specification, illustrated in the accompanying drawings and pointed out in the appended claim.

In the drawings, Figure 1 is a fragmentary side elevation of a rear axle of a truck frame and one of my improved springs. Fig. 2 is a similar front elevation of a front wheel. Fig. 3 is an enlarged fragmentary section of my device.

Referring more particularly to the drawings, numeral 1 indicates a fragment of a truck frame to which my device is secured.

My device includes a cylinder 2 which is open at both ends and has flanged lugs 3 for securing it to the truck 1. Cylinder 2 is provided with a cap 4 adapted to be secured to the top of the cylinder. Cap 4 may be of any desired length to suit the coiled springs 5 which are on rods 6. Rods 6 pass through holes in the top of cap 4, through springs 5 and loosely through a pressure plate 7 which is slidably mounted within cap 4 and is secured to the top of a vertical shaft 8 in such a way as to allow the shaft to revolve with respect to pressure plate 7 but not to become separated therefrom. Vertical guides 9 hold pressure plate 7 against rotation. By means of nuts 10 on the upper ends of rods 6, the initial compression in springs 5 may be varied by drawing up plate 7. Cylinder 2 has an internal flange 11 at the lower end. A check ring 12 adjustably secured to shaft 8 by set screws 13 limits the downward movement of shaft 8. Holes in cylinder 2 allow set screws 13 to be loosened from without the cylinder. On the lower end of vertical shaft 8 is a bearing 14 which is adapted to support a journal for a traction wheel 15. On the rear end of the frame, a jointed axle 16 is used while on the front end steering lugs 17 and rods 18 are used to allow each wheel to be directed as desired.

By means of my improved type of spring, it is possible to vary the initial compression to suit the service to which the truck is being put. Further, in using the truck on hauling loads up a steep grade, it would be desirable to elevate the rear end of the truck so as to place the truck body on a level plane to prevent the load from shifting.

With my improved springs, each wheel operates independently of all other wheels and therefore, conforms to unevenness of road surface better than the usual forms of springs.

While I have shown a particular form of embodiment of my invention, I am aware that many minor changes therein will readily suggest themselves to others skilled in the art without departing from the spirit and scope of the invention, and I therefore, desire to avoid being limited to the exact form shown and described.

What I claim as new and desire to protect by Letters Patent, is—

In a device of the character described, the combination of a cylindrical outer casing attachable to a vehicle frame, a vertical axle shaft revolubly mounted within said casing and supporting a traction wheel at its lower end, coiled springs interposed between the top of said vertical shaft and the upper end of the said casing, whereby a resilient support is formed for the casing with respect to the vertical shaft, rods passing loosely through holes in the top of said casing centrally through said coil springs and through holes in the top of said vertical shaft, nuts upon the ends of said rods, whereby the initial compression of the coiled springs may be adjustably varied, and adjustable limit stops upon the said vertical shaft, whereby the limit of extension of said shaft may be regulated regardless of said rods.

CHARLES J. TRUCANO.